US012336566B2

(12) United States Patent
Li et al.

(10) Patent No.: US 12,336,566 B2
(45) Date of Patent: Jun. 24, 2025

(54) GRAPHENE ELECTRONIC HEATING DEVICE AND PREPARATION METHOD THEREOF

(71) Applicant: LUXSHARE PRECISION INDUSTRY CO., LTD., Shenzhen (CN)

(72) Inventors: Huabing Li, Shenzhen (CN); Zhongyuan Lai, Shenzhen (CN); Yu Huang, Shenzhen (CN); Jia Yang, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 402 days.

(21) Appl. No.: 17/825,507

(22) Filed: May 26, 2022

(65) Prior Publication Data

US 2023/0255263 A1 Aug. 17, 2023

(30) Foreign Application Priority Data

Feb. 11, 2022 (CN) ......................... 202210128227.9

(51) Int. Cl.

*A24F 40/46* (2020.01)
*A24F 40/10* (2020.01)

(Continued)

(52) U.S. Cl.

CPC ............... *A24F 40/46* (2020.01); *H05B 3/48* (2013.01); *H05B 2203/017* (2013.01); *H05B 2214/04* (2013.01)

(58) Field of Classification Search

CPC ... H05B 3/40; H05B 3/42; H05B 3/44; H05B 3/48; H05B 3/145

See application file for complete search history.

(56) References Cited

U.S. PATENT DOCUMENTS 10,295,173 B1 * 5/2019 Most ........................ H05B 3/06

FOREIGN PATENT DOCUMENTS

| | | |
|---|---|---|
| CN | 204409589 U | 6/2015 |
| CN | 108272140 A | 7/2018 |

(Continued)

OTHER PUBLICATIONS

English Machine Translation of CN 207912055, obtained from PE2E Search (Clarivate Analytics) (Year: 2018).*

(Continued)

*Primary Examiner* — Philip Y Louie
*Assistant Examiner* — Charlotte Davison
(74) *Attorney, Agent, or Firm* — Birch, Stewart, Kolasch & Birch, LLP

(57) ABSTRACT

A graphene electronic heating device and a preparation method thereof are provided. The graphene electronic heating device includes a graphene layer, which is used as a heat source for fully heating a to-be-combusted substance in an accommodating cavity, a Teflon layer and a ceramic layer, which are arranged for realizing that the to-be-combusted substance can be continuously and stably combusted in the accommodating cavity without peculiar smell diffusion, and meanwhile increasing the endurance time of the graphene electronic heating device under the equal energy storage; the preparation method has simple process, convenient process control and stable product quality, and facilitates to large-scale production.

6 Claims, 4 Drawing Sheets

(51) Int. Cl.

| | |
|---|---|
| *A24F 40/20* | (2020.01) |
| *A24F 40/70* | (2020.01) |
| *H05B 3/02* | (2006.01) |
| *H05B 3/04* | (2006.01) |
| *H05B 3/06* | (2006.01) |
| *H05B 3/14* | (2006.01) |
| *H05B 3/42* | (2006.01) |
| *H05B 3/48* | (2006.01) |

(56) References Cited

FOREIGN PATENT DOCUMENTS

| | | | | | |
|---|---|---|---|---|---|
| CN | 207784282 | U | | 8/2018 | |
| CN | 108572013 | A | | 9/2018 | |
| CN | 207912055 | U | * | 9/2018 | |
| CN | 109561736 | A | | 4/2019 | |
| CN | 109674095 | A | | 4/2019 | |
| CN | 109757778 | A | | 5/2019 | |
| CN | 110022624 | A | * | 7/2019 | H05B 3/02 |
| CN | 110074461 | A | | 8/2019 | |
| CN | 110495649 | A | | 11/2019 | |
| CN | 209931494 | U | | 1/2020 | |
| CN | 110810928 | A | | 2/2020 | |
| CN | 112056631 | A | * | 12/2020 | |
| CN | 113424998 | A | * | 9/2021 | |
| CN | 113558305 | A | | 10/2021 | |
| CN | 214802339 | U | | 11/2021 | |
| CN | 215453321 | U | * | 1/2022 | |

OTHER PUBLICATIONS

English Machine Translation of CN 112056631, obtained from PE2E Search (Clarivate Analytics) (Year: 2020).*

English Machine Translation of CN 113424998, obtained from PE2E Search (Clarivate Analytics) (Year: 2021).*

English Machine Translation of CN 215453321, obtained from PE2E Search (Clarivate Analytics) (Year: 2022).*

English Machine Translation of CN 110022624, obtained from PE2E Search (Clarivate Analytics) (Year: 2019).*

Hegbom, T. Integrating Electrical Heating Elements in Product Design [online], Jan. 2017 [retrieved on Oct. 16, 2024]. Retrieved from the internet <DOI: 10.1201/9781315214436> 1st ed. Chapter 1, pp. 33-34, 54-57, ISBN 9781315214436. (Year: 2017).*

* cited by examiner

GRAPHENE ELECTRONIC HEATING DEVICE AND PREPARATION METHOD THEREOF

TECHNICAL FIELD

The present disclosure relates to the technical field of electronic heating devices, and particularly to a graphene electronic heating device and a preparation method thereof.

BACKGROUND

The traditional heat-not-burn electronic cigarette uses a heating method of pin-type heating element, which provides an incomplete combustion and produces peculiar smell, thus affecting the user experience.

The existing art mostly focuses on the atomizer, the core component of electronic cigarette products, for development and improvement.

CN110419779A discloses an electronic cigarette atomizer, an electronic cigarette and a preparation method of an atomizing assembly; in this disclosure, the electronic cigarette atomizer includes a cavity for storing a liquid matrix, and the atomizing assembly used for absorbing the liquid matrix from the cavity and atomizing the liquid matrix by heating to generate aerosol; the atomizing assembly includes a porous body, and at least a part of the surface of the porous body is coated with a metal layer; the metal layer is formed by decomposing carbonyl metal at a temperature higher than the lowest decomposition temperature to generate a metal elementary substance and coating the metal elementary substance on the porous body surface; a heating material layer is arranged on the surface of the metal layer facing away the porous body; and at least a part of the surface of the porous body, not coated with the metal layer, is configured as a liquid-absorbing surface in contact with the liquid matrix. For the electronic cigarette atomizer, the heating material layer in the atomizing assembly is bonded with the porous body through the metal layer, so that the bonding compactness is higher, the stability and uniformity of a resistance value are better guaranteed, and the deformation amount and the falling rate of the heating material layer in preparation and use are lower.

CN110710731A discloses an electronic cigarette atomizing-heating device, a preparation method thereof and an electronic cigarette; the electronic cigarette atomizing-heating device includes a micropore ceramic carrier, two electrode pins, and a heating film layer arranged on the upper surface of the microporous ceramic carrier; the microporous ceramic carrier is provided with a oil storage groove for storing tobacco oil and a plurality of micropores passing through the micropore ceramic carrier; the heating film layer is used for heating a micropore ceramic substrate; and the tobacco oil in the oil storage groove is atomized after heating and leaks from the micropores of the micropore ceramic substrate. The electronic cigarette atomizing-heating device has the advantages of stable heating, high heating rate, high strength, long service life and the like; the bonding strength between the heating film layer and the micropore ceramic carrier is high, so that the smoke leaking phenomenon is avoided, and good user experience is achieved.

However, the methods described above neglect the problem of peculiar smell produced by electronic cigarettes.

CN110810928A discloses an electronic cigarette device, including a power module, a control module and a heating module, in which the control module is electrically connected with the power module and the heating module. The heating module includes: a heat-insulating cover; a heating assembly, which is arranged in the heat-insulating cover, including a support cylinder, a heat-conducting main part and a heating element, in which the heat-conducting main part is sheathed in the supporting cylinder and covers at least a part of the heating element, and the heat-conducting main part has a cylinder shape, and an air-guiding groove is arranged on the outer wall of the heat-conducting main part from the bottom to the top; a cigarette body accommodating tube, at least a part of which is arranged in the heat-insulating cover; an air-guiding part, which is arranged between the heating assembly and the cigarette body accommodating tube, and provided with a first air-guiding hole which communicates the inner space of the cigarette body accommodating tube and the air-guiding groove. The electronic cigarette device can avoid the peculiar smell of the heated air. However, the cigarette body accommodating cavity and the heating element have a sheathing relationship in the electronic cigarette device, instead of being divided into the upper layer and the lower layer, and thus only the front-end part of the cigarette body can be heated.

Therefore, it has great significance to develop a graphene electronic heating device, which facilitates a to-be-combusted substance combusting fully in the accommodating cavity without peculiar smell diffusion, and a preparation method thereof.

SUMMARY

In view of the problems existing in the prior art, the present disclosure provides a graphene electronic heating device and a preparation method thereof. The graphene layer is used as a heat source for fully heating a to-be-combusted substance in an accommodating cavity, and a Teflon layer and a ceramic layer are arranged, thus realizing no to-be-combusted substance left, low energy consumption, and no peculiar smell.

In order to achieve this object, the present disclosure adopts the technical solutions described below.

In a first aspect, the present disclosure provides a graphene electronic heating device, and the graphene electronic heating device includes an accommodating cavity, a first insulating layer, a graphene layer, a second insulating layer and a ceramic layer sequentially from the inside to the outside; a conductive line is arranged on the graphene layer, and the conductive line is electrically connected with one or more electrodes.

It can be understood that the arrangement of the conductive line on the graphene layer includes arranging the conductive line on the graphene layer surface or in the graphene layer interior.

In the graphene electronic heating device provided in the present disclosure, the conductive line is arranged on the graphene layer, the conductive line is electrically connected with the electrode, and the graphene layer is used as a heat source for heating a to-be-combusted substance in the accommodating cavity. Graphene has the characteristics of rapid intense-heat production, rapid heat transfer and low energy loss, which guarantees the to-be-combusted substance reaches the normal ignition point quickly and gets combustion. Compared with the prior art which uses the heating pin to heat the corresponding heating part by inserting repeatedly, the present disclosure effectively avoids incomplete combustion of the to-be-combusted substance. The graphene electronic heating device of the present disclosure is respectively provided with a first insulating layer and a second insulating layer between the accommodating cavity and the graphene layer and between the graphene layer and the ceramic layer, which not only insulate the heat transfer, but also encapsulate the accommodating cavity and the graphene layer to prevent the diffusion of metal odor or graphene odor; the ceramic layer is mainly configured for preventing heat loss, ensuring the continuous and stable combustion of the to-be-combusted substance in the accommodating cavity, and increasing the endurance time of the graphene electronic heating device under the equal energy storage condition. The accommodating cavity of the graphene electronic heating device has a radial annular cavity structure, so that the inserted to-be-combusted substance can be placed without radial limitation around the 360° directions, ensuring that the to-be-combusted substance that is randomly placed can contact with the inside of the accommodating cavity and get uniform combustion at its periphery, and avoiding the defects of the to-be-combusted substance such as unburned corner left or irregular combustion on one side.

Preferably, the accommodating cavity includes a metal cavity.

Preferably, a material of the ceramic layer includes zirconia.

Preferably, the conductive line is encapsulated in the graphene layer.

In the present disclosure, preferably, the conductive line is encapsulated in the graphene layer, which is conducive to rapid heating and good temperature control.

Preferably, a material of the first insulating layer and the second insulating layer includes Teflon.

In the present disclosure, preferably, the material of the first insulating layer and the second insulating layer includes Teflon, and Teflon has the following characteristics: 1) it is resistant to high temperatures of 240° C. to 300° C., and has no peculiar smell volatilized under high temperature. 2) Teflon has excellent heat-conducting property, which can quickly transfer the high temperature produced by the graphene layer under electricity effect to the accommodating cavity, greatly reducing the heat energy consumption and increasing the endurance time of the graphene electronic heating device under the equal energy storage. 3) Teflon has excellent insulating property, and by coating Teflon on the outer surface of the accommodating cavity integrally, the graphene layer and the accommodating cavity are insulated from each other and there will be no short circuit. 4) Teflon has excellent acid and alkali resistance and oxidation resistance, and by coating Teflon on the outer surfaces of the accommodating cavity and the graphene layer respectively, the graphene layer and the accommodating cavity can be protected from chemically reacting with the external substances, significantly increasing the serve life of the graphene electronic heating device. 5) Teflon has an excellent anti-stick and smooth property, which prevents the residue after combustion from sticking to the inner wall of the accommodating cavity.

The graphene electronic heating device provided in the present disclosure also includes a component and an enclosure case for assembling the various layers together.

In a second aspect, the present disclosure also provides a preparation method of the graphene electronic heating device according to the first aspect, including the following steps:

(1) depositing a first insulating material on the outer side of the accommodating cavity to obtain a first component; arranging the conductive line on the graphene layer to obtain a second component;

(2) installing the second component outside the first component to obtain a third component;

(3) depositing a second insulating material on the outer side of the third component to obtain a fourth component; and (4) installing a ceramic tube outside the fourth component, and electrically connecting the electrode to the conductive line to obtain the graphene electronic heating device.

Preferably, the "arranging the conductive line on the graphene layer" in step (1) includes immersing the conductive line in a graphene slurry and then subjecting the same to curing molding to obtain the conductive line encapsulated in the graphene slurry; compared with the method in which the conductive line is directly printed on the cured graphene layer, the conductive line encapsulated in the graphene slurry allows the graphene particles to contact with the conductive line fully, has good temperature control and facilitates graphene being heated rapidly.

Additionally, it can be understood that the obtained conductive line encapsulated in the graphene slurry is the conductive line at least partially encapsulated in the graphene slurry. Moreover, it can also be understood that the electrically connecting between the conductive line and the electrode can be realized by leading the electrode to pass through an opening, which is reserved in advance on the graphene layer, for directly connecting the conductive line, or by indirectly connecting through the graphene layer without an opening reserved.

The preparation method of the graphene electronic heating device provided in the present disclosure has simple operation, high production efficiency, convenient process control and stable product quality, and facilitates to large-scale production.

In a third aspect, the present disclosure also provides a graphene electronic heating device, including a graphene layer and a ceramic layer sequentially from the inside to the outside; a heat-insulating layer and a third insulating layer are sequentially arranged on the outer side of the ceramic layer; and a conductive line is arranged between the graphene layer and the ceramic layer, in which the conductive line is electrically connected with one or more electrodes.

In the graphene electronic heating device provided in the present disclosure, the conductive line is arranged between the graphene layer and the ceramic layer, the conductive line is electrically connected with the electrode, and the graphene layer is used as a heat source to heat a to-be-combusted substance. No metal accommodating cavity is provided for the to-be-combusted substance in the graphene electronic heating device, and the to-be-combusted substance is directly in contact with the graphene layer, which effectively avoids the generation of metal odor, and the ceramic layer is a ceramic tube, which supports the to-be-combusted substance. The third insulating layer is mainly configured for insulating and preventing the graphene odor diffusion.

Preferably, a material of the ceramic layer includes zirconia.

Preferably, a material of the heat-insulating layer includes aerogel.

Preferably, a material of the third insulating layer includes Teflon.

Preferably, a width of the conductive line is 1.0 mm to 1.5 mm, such as 1.0 mm, 1.1 mm, 1.2 mm, 1.3 mm, 1.4 mm or 1.5 mm.

Preferably, a thickness of the conductive line is 0.08 mm to 0.12 mm, such as 0.08 mm, 0.09 mm, 0.1 mm, 0.11 mm or 0.12 mm.

Preferably, the conductive line includes a silver conductive paste line.

In a fourth aspect, the present disclosure also provides a preparation method of the graphene electronic heating device according to in the third aspect, including the following steps:

(I) printing the conductive line on the inner wall of a ceramic tube to obtain a pre-treated ceramic tube;

(II) depositing graphene on the inner wall of the pre-treated ceramic tube to obtain a semifinished component; and (III) spraying a heat-insulating material and a third insulating material sequentially on the outer side of the semi-finished component, and installing an electrode to obtain the graphene electronic heating device.

The preparation method of the graphene electronic heating device provided in the present disclosure uses the ceramic tube as a main body. The conductive line is printed and graphene is deposited on the inner wall of the tube sequentially, and the heat-insulating material and the third insulating material are sprayed on the outer wall of the tube sequentially, so as to obtain the odor-free graphene electronic heating device with ceramic tube as a support. The preparation method is very simple, the product has good lot-to-lot quality stability, the yield of qualified product is high, and the industrial continuous production can be realized.

Preferably, the graphene in step (II) deposited on the inner wall of the pre-treated ceramic tube has a thickness of 0.08 mm to 0.12 mm, such as 0.08 mm, 0.09 mm, 0.1 mm, 0.11 mm or 0.12 mm.

Preferably, the pre-treated ceramic tube in step (I) and the semifinished component in step (II) are both subjected to a baking treatment.

Preferably, a temperature of the baking treatment is 50° C. to 80° C., such as 50° C., 55° C., 60° C., 65° C., 70° C., 75° C. or 80° C.

Preferably, a time of the baking treatment is 20 min to 40 min, such as 20 min, 22 min, 25 min, 28 min, 29 min, 30 min, 35 min, 38 min or 40 min.

Preferably, the "spraying a heat-insulating material" in step (III) adopts a chemical deposition method.

Preferably, a proportion of the heat-insulating material is 0.56 kg/L to 0.60 kg/L, such as 0.56 kg/L, 0.57 kg/L, 0.58 kg/L, 0.59 kg/L or 0.60 kg/L.

Preferably, a volume solid content of the heat-insulating material is 86% to 90%, such as 86%, 86.5%, 87%, 87.4%, 88%, 88.6%, 89% or 90%.

Preferably, the heat-insulating material sprayed on the outer side of the semifinished component has a thickness of 0.3 mm to 0.8 mm, such as 0.3 mm, 0.35 mm, 0.38 mm, 0.4 mm, 0.5 mm, 0.6 mm, 0.7 mm or 0.8 mm.

Preferably, the heat-insulating material is subjected to a drying treatment after being sprayed.

Preferably, a temperature of the drying treatment is 10° C. to 140° C., such as 10° C., 20° C., 40° C., 60° C., 70° C., 90° C., 100° C., 120° C., 130° C. or 140° C.

Preferably, a theoretical coverage rate of the heat-insulating material is 0.65 $mm^2/(L\cdot mm)$ to 0.71 $mm^2/(L\cdot mm)$, such as 0.65 $mm^2/(L\cdot mm)$, 0.66 $mm^2/(L\cdot mm)$, 0.67 $mm^2/(L\cdot mm)$, 0.68 $mm^2/(L\cdot mm)$, 0.68 $mm^2/(L\cdot mm)$, 0.70 $mm^2/(L\cdot mm)$ or 0.71 $mm^2/(L\cdot mm)$.

Preferably, a thermal conductivity of the heat-insulating material is 0.033 W/(m·K) to 0.038 W/(m·K), such as 0.033 W/(m·K), 0.034 W/(m·K), 0.035 W/(m·K), 0.037 W/(m·K) or 0.038 W/(m·K).

Preferably, an aging resistance time of the heat-insulating material is 550 h to 650 h, such as 550 h, 560 h, 580 h, 590 h, 600 h, 630 h, 640 h or 650 h.

Preferably, the third insulating material sprayed on the outer side of the heat-insulating material in the step (III) has a thickness of 0.08 mm to 0.15 mm, such as 0.08 mm, 0.09 mm, 0.1 mm, 0.12 mm, 0.13 mm, 0.14 mm or 0.15 mm.

As a preferred technical solution of the present disclosure, the preparation method includes the following steps:

(I) printing the conductive line on the inner wall of a ceramic tube to obtain a pre-treated ceramic tube;

(II) subjecting the pre-treated ceramic tube to a baking treatment at 50° C. to 80° C. for 20 min to 40 min, and then depositing graphene with a thickness of 0.08 mm to 0.12 mm on the inner wall of the pre-treated ceramic tube to obtain a semifinished component; and (III) subjecting the semifinished component to a baking treatment at 50° C. to 80° C. for 20 min to 40 min, then spraying a heat-insulating material on the outer side of the semifinished component by a chemical deposition method, successively spraying a third insulating material with a thickness of 0.08 mm to 0.15 mm on the outer side, and installing an electrode to obtain the graphene electronic heating device;

a proportion of the heat-insulating material is 0.56 kg/L to 0.60 kg/L; a volume solid content of the heat-insulating material is 86% to 90%; the heat-insulating material sprayed on the outer side of the semifinished component has a thickness of 0.3 mm to 0.8 mm; the heat-insulating material is subjected to a drying treatment after being sprayed; a temperature of the drying treatment is 10° C. to 140° C.; a theoretical coverage rate of the heat-insulating material is 0.65 $mm^2/(L\cdot mm)$ to 0.71 $mm^2/(L\cdot mm)$; a thermal conductivity of the heat-insulating material is 0.033 W/(m·K) to 0.038 W/(m·K); and an aging resistance time of the heat-insulating material is 550 h to 650 h.

In a fifth aspect, the present disclosure also provides use of the graphene electronic heating device according to the first aspect or the third aspect, in which the graphene electronic heating device is used for heating a cigarette body.

Compared with the prior art, the present disclosure has at least the following beneficial effects:

(1) the graphene electronic heating device provided in the present disclosure realizes the full combustion of the to-be-combusted substance in the accommodating cavity without peculiar smell diffusion, improving the user experience;

(2) in the graphene electronic heating device provided in the present disclosure, Teflon is used for coating on the outer sides of the accommodating cavity and the graphene layer respectively, which protects the accommodating cavity and the graphene layer from chemically reacting with the external substances, significantly increasing the serve life of the graphene electronic heating device; and (3) in the graphene electronic heating device provided in the present disclosure, the ceramic layer is configured for preventing heat loss, guaranteeing the continuous and stable combustion of the to-be-combusted substance in the accommodating cavity and increasing the endurance time of the graphene electronic heating device under the equal energy storage condition.

REFERENCE LIST

1—accommodating cavity; 2—first insulating layer; 3—graphene layer; 4—second insulating layer; 5—ceramic layer; 6—component; 7—to-be-combusted substance; 8—enclosure case; 9—heat-insulating layer; and 10—third insulating layer.

DETAILED DESCRIPTION

Technical solutions of the present disclosure are further described below with reference to the accompanying drawings and through specific embodiments.

The present disclosure is further described in details below. However, the embodiments described below are merely simple examples of the present disclosure, and do not represent or limit the protection scope of the present disclosure. The protection scope of the present disclosure is intended to be limited solely by the appended claims.

It should be understood that in the description of the present disclosure, the terms "center", "lengthways", "crosswise", "over", "under", "front", "back", "left", "right", "vertical", "horizontal", "top", "bottom", "inner", "outer" and the like indicate an orientation or a positional relationship based on an orientation or a positional relationship shown in accompanying drawings, which is only used for describing the present application conveniently and simplifying the description, rather than indicating or implying that the device or unit referred to necessarily has a particular orientation or needs to be arranged and operated in a particular orientation, and thereby should not be construed as a limitation to the present application. In addition, the terms "primary", "secondary" and the like are only used for descriptive purposes, and should not be construed as indicating or implying relative importance, or indicating or implying a number of the technical feature referred to. Hence, a feature defined as "first", "second" or the like may expressly or implicitly include one or more of the features. In the description of the present disclosure, unless otherwise specified, "a plurality of" refers to two or more than two.

It should be noted that, in the description of the present application, unless otherwise specified or defined particularly, the terms "arrange", "link" and "connect" should be understood in a broad sense; for example, there may be a fixed connection, a detachable connection, or an integral connection; there may be a mechanical connection or an electrical connection; and there may be a direct connection, an indirect connection through an intermediate medium, or an internal communication between two units. For those skilled in the art, specific meanings of the above terms in the present application can be understood through specific situations.

Example 1

Figure 1:
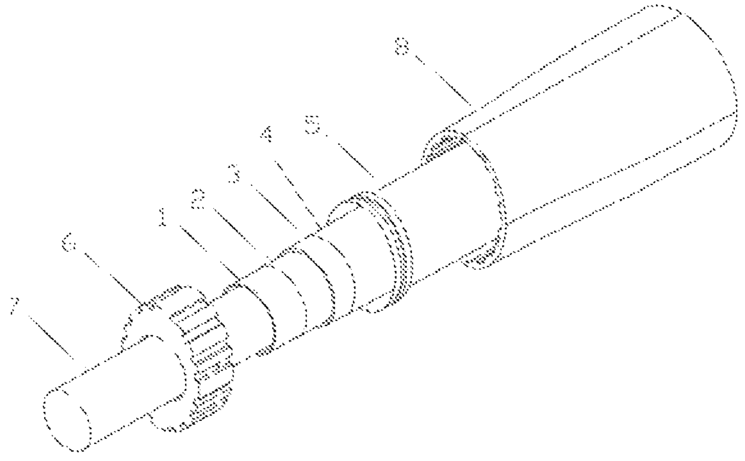
FIG. 1 is a schematic structural diagram of the graphene electronic heating device provided in Example 1 of the present disclosure.
Figure 3:
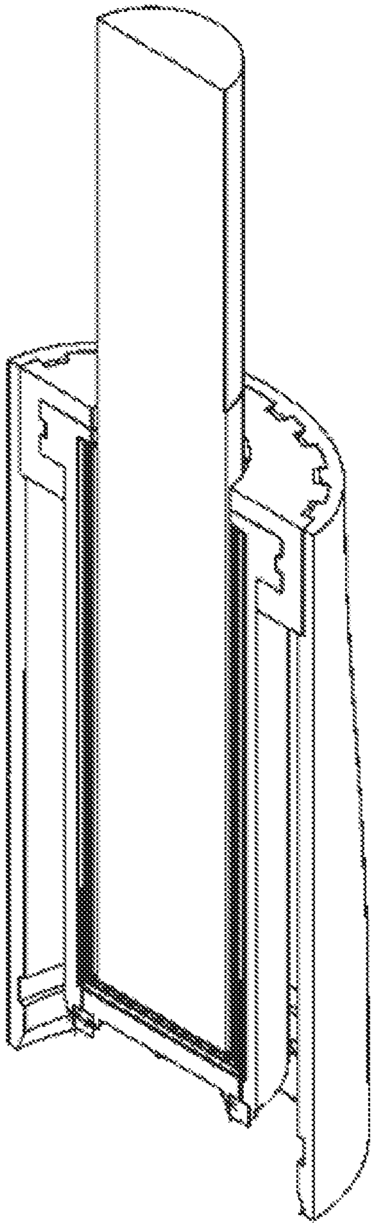
FIG. 3 is a cross-sectional view of the graphene electronic heating device provided in Example 1 of the present disclosure.

This example provides a graphene electronic heating device, of which the schematic structural diagram is shown in FIG. 1 and the cross-sectional view is shown in FIG. 3. The graphene electronic heating device included an accommodating cavity 1, a first insulating layer 2, a graphene layer 3, a second insulating layer 4 and a ceramic layer 5 sequentially from the inside to the outside. The graphene electronic heating device also included a component 6 and an enclosure case 8 for assembling the various layers together. FIG. 1 also included a to-be-combusted substance 7.

Figure 2:
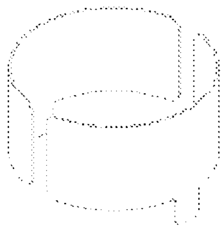
FIG. 2 is a schematic structural diagram of the electrodes in the graphene electronic heating device provided in Example 1 of the present disclosure.

A conductive line was arranged on the graphene layer 3, specifically, the conductive line encapsulated in a graphene slurry. The conductive line was electrically connected with electrodes, and the schematic structural diagram of the electrodes was shown in FIG. 2.

The accommodating cavity 1 included a metal cavity; a material of the ceramic layer 5 included zirconia, and a material of the first insulating layer 2 and the second insulating layer 4 included Teflon.

Example 2

This example provides a preparation method of the graphene electronic heating device provided in Example 1, and the preparation method included the steps described below.

(1) A first insulating material of Teflon was deposited on the outer side of the accommodating cavity to obtain a first component; the conductive line was immersed in a graphene slurry and then subjected to curing molding to obtain the conductive line encapsulated in the graphene slurry as a second component;

(2) The second component was installed outside the first component to obtain a third component;

(3) A second insulating material of Teflon was deposited on the outer side of the third component to obtain a fourth component; and (4) A ceramic tube was installed outside the fourth component, and the electrodes were electrically connected with the conductive line to obtain the graphene electronic heating device.

Example 3

Figure 4:
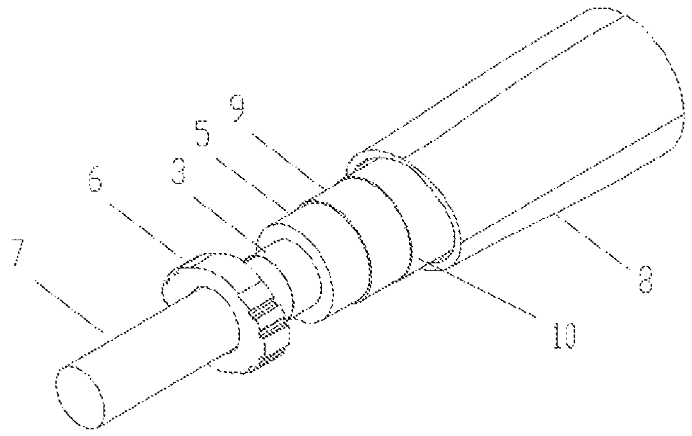
FIG. 4 is a schematic structural diagram of the graphene electronic heating device provided in Example 3 of the present disclosure.
Figure 6:
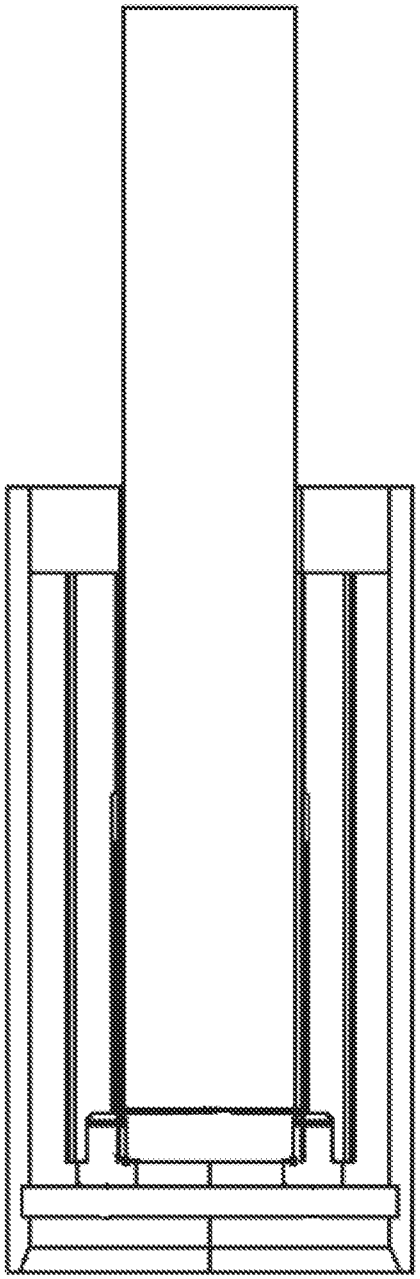
FIG. 6 is a cross-sectional view of the graphene electronic heating device provided in Example 3 of the present disclosure.

This example provides a graphene electronic heating device, of which the schematic structural diagram is shown in FIG. 4 and the cross-sectional view is shown in FIG. 6. The graphene electronic heating device included a graphene layer 3 and a ceramic layer 5 sequentially from the inside to the outside; a heat-insulating layer 9 and a third insulating layer 10 were sequentially arranged on the outer side of the ceramic layer 5. The graphene electronic heating device also included a component 6 and an enclosure case 8 for assembling the various layers together. FIG. 3 also included a to-be-combusted substance 7.

Figure 5:
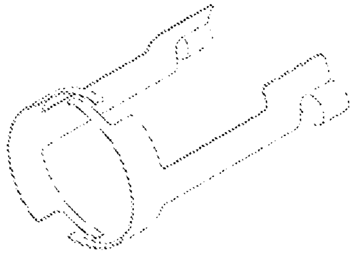
FIG. 5 is a schematic structural diagram of the silver conductive paste line in the graphene electronic heating device provided in Example 3 of the present disclosure.

A silver conductive paste line was arranged between the graphene layer 3 and the ceramic layer 5. The schematic structural diagram of the silver conductive paste line is shown in FIG. 5. The silver conductive paste line was electrically connected with an electrode.

A material of the ceramic layer 5 included zirconia; a material of the heat-insulating layer 9 included aerogel; a material of the third insulating layer 10 included Teflon; a width of the silver conductive paste line was 1.5 mm; and a thickness of the silver conductive paste line was 0.1 mm.

Example 4

This example provides a preparation method of the graphene electronic heating device provided in Example 3, and the preparation method included the steps described below.

(I) The silver conductive paste line was printed on the inner wall of a ceramic tube to obtain a pre-treated ceramic tube;

(II) The pre-treated ceramic tube was subjected to a baking treatment at 70° C. for 30 min, and graphene was deposited with a thickness of 0.1 mm on the inner wall of the pre-treated ceramic tube to obtain a semifinished component; and (III) The semifinished component was subjected to a baking treatment at 60° C. for 30 min, then a heat-insulating material was sprayed on the outer side of the semifinished component by a chemical deposition method, a third insulating material was successively sprayed with a thickness of 0.1 mm on the outer side, and an electrode was installed to obtain the graphene electronic heating device.

A proportion of the heat-insulating material was 0.58 kg/L; a volume solid content of the heat-insulating material was 86%; the heat-insulating material sprayed on the outer side of the semifinished component had a thickness of 0.5 mm; the heat-insulating material was subjected to a drying treatment after being sprayed; a temperature of the drying treatment was 120° C.; a theoretical coverage rate of the heat-insulating material was 0.71 $mm^2/(L \cdot mm)$; a thermal conductivity of the heat-insulating material was 0.033 $W/(m \cdot K)$; and an aging resistance time of the heat-insulating material was 600 h.

Example 5

This example provides a preparation method of the graphene electronic heating device provided in Example 3, and the preparation method included the steps described below.

(I) The silver conductive paste line was printed on the inner wall of a ceramic tube to obtain a pre-treated ceramic tube;

(II) The pre-treated ceramic tube was subjected to a baking treatment at 50° C. for 40 min, and graphene was deposited with a thickness of 0.08 mm on the inner wall of the pre-treated ceramic tube to obtain a semifinished component; and (III) The semifinished component was subjected to a baking treatment at 80° C. for 20 min, then a heat-insulating material was sprayed on the outer side of the semifinished component by a chemical deposition method, a third insulating material was successively sprayed with a thickness of 0.15 mm on the outer side, and an electrode was installed to obtain the graphene electronic heating device.

A proportion of the heat-insulating material was 0.60 kg/L; a volume solid content of the heat-insulating material was 90%; the heat-insulating material sprayed on the outer side of the semifinished component had a thickness of 0.8 mm; the heat-insulating material was subjected to a drying treatment after being sprayed; a temperature of the drying treatment was 100° C.; a theoretical coverage rate of the heat-insulating material was 0.65 $mm^2/(L \cdot mm)$; a thermal conductivity of the heat-insulating material was 0.038 $W/(m \cdot K)$; and an aging resistance time of the heat-insulating material was 650 h.

To sum up, the graphene electronic heating device provided in the present disclosure uses the graphene layer as a heat source, which realizes the full combustion of the to-be-combusted substance in the accommodating cavity without peculiar smell diffusion, improving the user experience; Teflon is used for coating on the outer sides of the accommodating cavity and the graphene layer respectively, which protects the accommodating cavity and the graphene layer from chemically reacting with the external substances, significantly increasing the serve life of the graphene electronic heating device; and the ceramic layer is configured for preventing heat loss, guaranteeing the continuous and stable combustion of the to-be-combusted substance in the accommodating cavity and increasing the endurance time of the graphene electronic heating device under the equal energy storage.

The applicant has stated that the description hereinabove is only specific embodiments of the present disclosure, and the protection scope of the present disclosure is not limited to the description hereinabove. It should be apparent to those skilled in the art that any variations or replacements in the technical scope disclosed by the present disclosure, which are obvious to those skilled in the art of the technical filed, all fall within the protection extent and disclosure scope of the present disclosure.

What is claimed is:

1. A graphene electronic heating device, consisting of an accommodating cavity, a first insulating layer, a graphene layer, a second insulating layer and a ceramic layer arranged in sequence from the inside to the outside, wherein a conductive line is arranged on the graphene layer, and the conductive line is electrically connected with one or more electrodes;

wherein a material of the ceramic layer is zirconia; and wherein a material of the first insulating layer and the second insulating layer is polytetrafluroethylene.

2. The graphene electronic heating device according to claim 1, wherein the accommodating cavity comprises a metal cavity.

3. A graphene electronic heating device, consisting of an accommodating cavity, a first insulating layer, a graphene layer, a second insulating layer and a ceramic layer arranged in sequence from the inside to the outside, wherein a conductive line is encapsulated in the graphene layer, and the conductive line is electrically connected with one or more electrodes;

wherein a material of the ceramic layer is zirconia; and wherein a material of the first insulating layer and the second insulating layer is polytetrafluoroethylene.

4. A graphene electronic heating device, consisting of a graphene layer, a ceramic layer, a heat-insulating layer and insulating layer arranged in sequence from the inside to the outside, wherein a conductive line is arranged between the graphene layer and the ceramic layer, wherein the conductive line is electrically connected with one or more electrodes:

wherein a material of the ceramic layer is zirconia; and wherein a material of the insulating layer is polytetrafluoroethylene.

5. The graphene electronic heating device according to claim 4, wherein a material of the heat-insulating layer comprises aerogel.

6. The graphene electronic heating device according to claim 4, wherein a width of the conductive line is 1.0 mm to 1.5 mm, a thickness of the conductive line is 0.08 mm to 0.12 mm.

* * * * *